Feb. 19, 1963 G. M. BELLANCA ET AL 3,078,202
TYPE OF CONSTRUCTION
Filed June 1, 1956 6 Sheets-Sheet 1

INVENTORS
GUSEPPI BELLANCA
AUGUST BELLANCA
BY
ATTORNEY

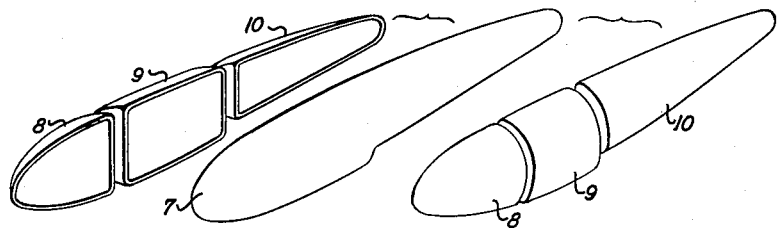
FIG. 5
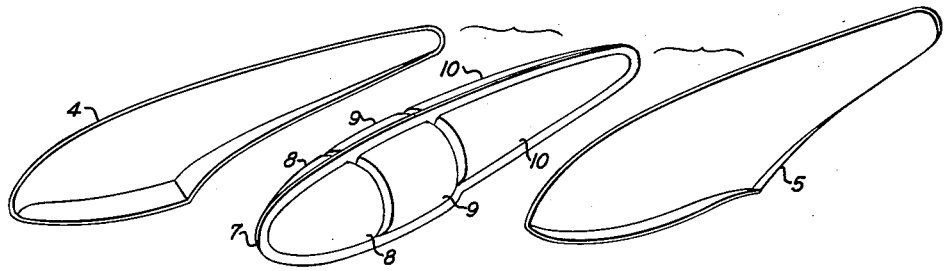
FIG. 6
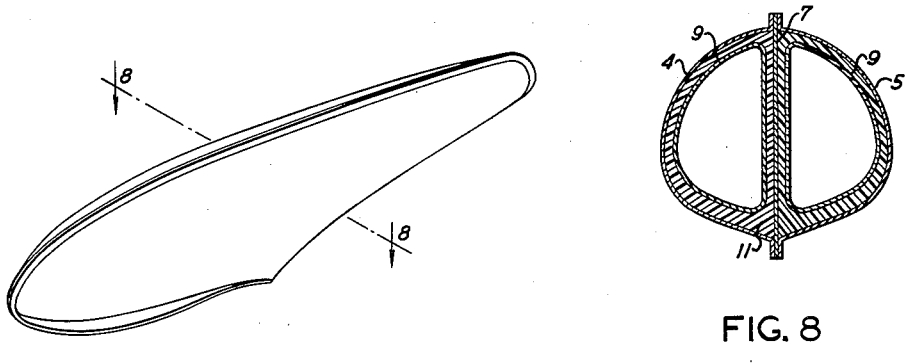
FIG. 7
FIG. 8
INVENTORS
GUSEPPI BELLANCA
AUGUST BELLANCA
BY
ATTORNEY Feb. 19, 1963 G. M. BELLANCA ETAL 3,078,202
TYPE OF CONSTRUCTION
Filed June 1, 1956 6 Sheets-Sheet 4

INVENTORS
GUSEPPI BELLANCA
AUGUST BELLANCA

BY

ATTORNEY

Feb. 19, 1963 G. M. BELLANCA ET AL 3,078,202
TYPE OF CONSTRUCTION
Filed June 1, 1956 6 Sheets-Sheet 5

INVENTORS
GUSEPPI BELLANCA
AUGUST BELLANCA

BY *P. J. Norton*

ATTORNEY

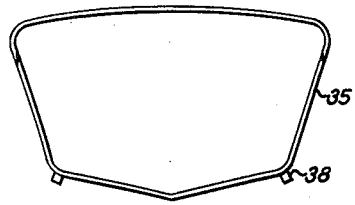
FIG. 22
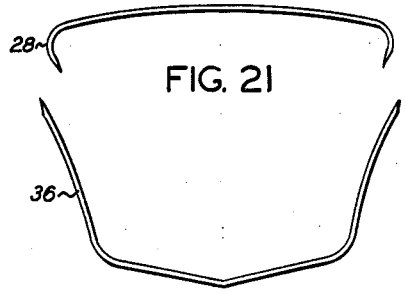
FIG. 21
FIG. 20
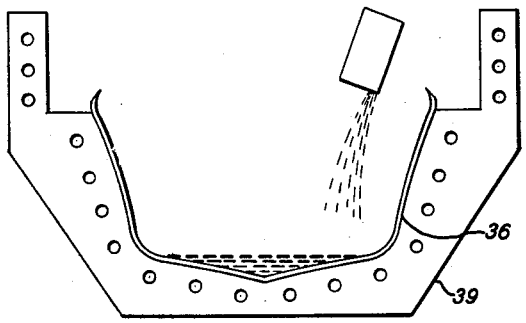
FIG. 23
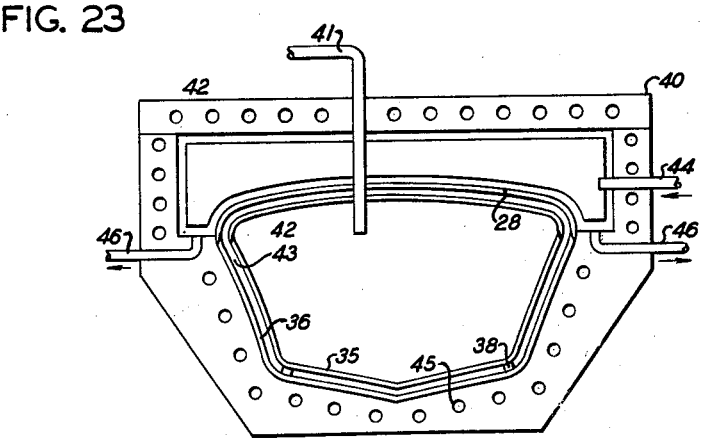
FIG. 24
INVENTOR
GUSEPPI BELLANCO
AUGUST BELLANCO
BY *Raymond J. Koster*
ATTORNEY

3,078,202
TYPE OF CONSTRUCTION

Giuseppe Mario Bellanca and August T. Bellanca, Galena, Md.; Dorothy Bellanca and August Thomas Bellanca executors of said Giuseppe Mario Bellanca, deceased
Filed June 1, 1956, Ser. No. 588,930
7 Claims. (Cl. 154—45.9)

This invention relates to a new type of construction for structural or non-structural bodies and more particularly monocoque and semi-monocoque bodies such as boat and ship hulls, submarine hulls, automobile bodies, train car bodies, buses, airplane components such as wings, fuselages and tail surfaces etc., helicopters and other machines such as rocket ships, space ships, etc.

The main object of this invention is to devise and achieve a structure which is easily made or fabricated and which is functionally highly efficient. In other words to provide a structural body of high strength weight ratio and great rigidity and at the same time one which has a minimum number of parts and which parts or sub-assemblies can be assembled with facility in a minimum amount of time.

In the typical or orthodox structures used at present both the manufacturer and the designer are confronted with many problems. For instance, in aircraft most of which use a semi-monocoque stressed skin structure, a great number of stiffeners are required to give stability to the strong but flexible skin. There are many other parts required in conjunction with these, such as gussets, fillers, etc. The bulkheads and ribs are made of many different parts and all of these sub-assemblies must be assembled in many different holding fixtures. All these parts when put together constitute an interior shape which has many abrupt changes in contour, thus causing the loads to be carried and distributed through the body inefficiently. Also the method of attachment of the several elements of the structure is relatively inefficient since it relies on fittings such as thousands of rivets and bolts each of which have to pick up concentrated loads. Recently adhesive bonding of metal to metal has been used but this is a difficult and uncertain method since there is an inherent difference between the adhesives and metal. Also skins with integral stringers are being made now by machining from a solid block of metal, this is however very costly.

Another method of construction used for aircraft to a somewhat more limited extent is monocoque wood sandwich construction, this type of structure uses a composite which consists essentially of a lightweight honey-comb material with two dense thinner high strength sheets adhered on either side. Structures using this material do not need so many stiffeners since the skin is more rigid, but it still must be built in the same manner as most wood structures in that there are many joints and thus gussets and other reinforcing members are required. As in metal construction many of the joints are inefficient butt joints and thus complex ways of fastening are required. This type of structure poses many difficulties in manufacture.

Also in marine structures and road vehicles such as trains the problems are of a similar nature as those described above in that they are built of braced skins, many pieces are required and the means of attaching these pieces together is difficult and inefficient.

The novel product of our invention essentially is a structural or non-structural body or member which is built with a minimum number of sub-assemblies and local joints and which is structurally highly efficient. Such novel structure comprises a body consisting of an exterior shell (outside covering) and a number of interior shells, the latter being separated from each other and the exterior shells by a light weight core material. These shells are substantially closed surfaces and the curvatures obviously may vary a great deal. In this type of construction then there would be needed only a minimum number of direct connections between the shells since the light weight core material functions to hold these shells in their respective preestablished positions. With this type of construction in contrast to other types, the method of assembly is exceptionally easy in that the shells, for instance, may be assembled in their respective positions with a spacing in between the walls of the interior and exterior shells and a foaming material of selected rigidity foamed in situ in between these shell surfaces fixing the interior shells relative to the exterior shell. The interior shells would be fixed in every direction and the interior shells being basically closed shells do not permit the foaming material to enter. The foaming material stays as a separation, and is a functionally advantageous element of the structure. Thus the structure would be fixed into its assembled position in a very short period of time. A mold need not be used under all conditions but a holding fixture of a flimsier nature may be used since any pressure built up inside may be restricted by the exterior surrounding shell. The expansion could also be held from the outside by restraining air pressure. The interior cells by virtue of their being closed could also be restrained again foaming pressure by interior air pressure applied by pipes, etc. The foam materials used today are foamed isocyanates, isocyanate polyester polymers, phenolics, polystyrene, polyvinyl chloride and silicone. However that does not imply that a better light weight core material may not be used in the future. These may be of chosen or selected rigidity and can be directly adhered to the shell structure by adhesive or by adhesion during the foaming and curing operations. Also other light weight materials may be used as this separation unit, such as balsa wood which has been cut to shape and glued in place or the prefabricated foam type materials may be used by cutting them to the desired shape.

The shell material can be made using most any kind of material of a denser high strength nature. Among those that we known of today are sheet aluminum and magnesium alloys, plastic, steel, titanium or the other metals and alloys, or fiber glass reinforced plastics. But any suitable high strength material can be used.

The advantages inherent in and obtained by this type of body where it is used as a structural body, as compared to other types may be summarized as follows:

(1) Stress flow around curvatures and notches. A good foam factor,
(2) Maximum strength to weight ratio in bending,
(3) Maximum rigidity to weight ratio in bending,
(4) Maximum strength weight ratio in torsion,
(5) Maximum rigidity to weight ratio in torsion,
(6) Resistance to wrinkling,
(7) Resistance to vibration of all types,
(8) Maximum natural frequency in torsion,
(9) Resistance to heat transfer and sound,
(10) Ease of construction and facility in assemblage.

This invention may be readily understood from an examination of the drawing in which illustrative units thereof are depicted and in which like reference numerals designate like parts.

In the drawings,

FIGS. 5, 6, 7 and 8 are views similar respectively to FIGS. 1, 2, 3 and 4 illustrating a method and means of desirably reinforcing the structure.

Figure 19:
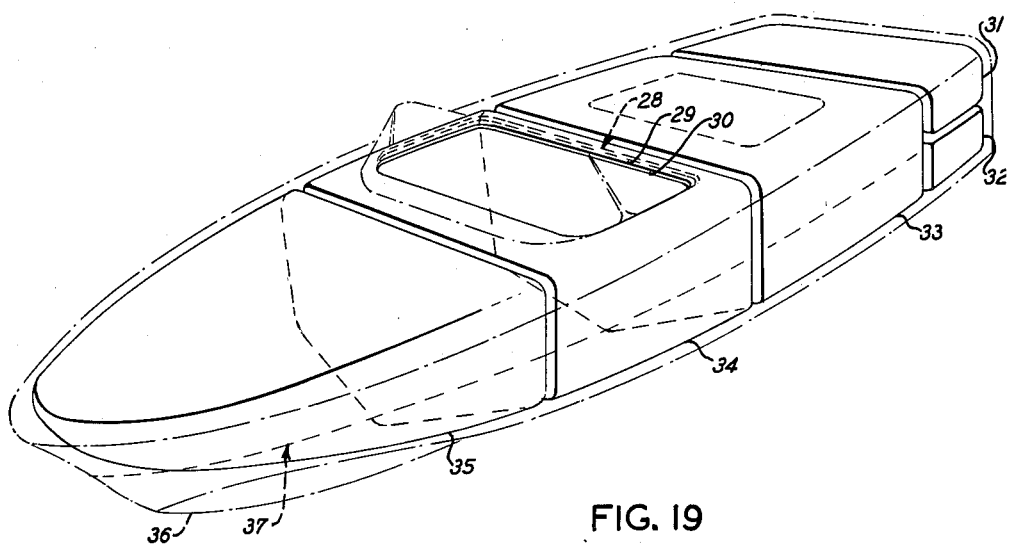
FIG. 19 is an illustration of a boat construction utilizing the novel suspended shell construction of the invention.
Figure 14:
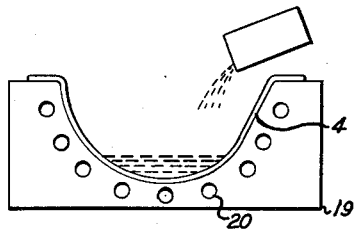
FIGS. 14, 15, 16, 17 and 18 are views illustrating the sequence of steps and assemblage of structure using foam material as the core for the floats or other units.
Figure 15:
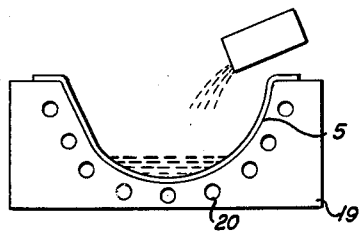
Figure 16:
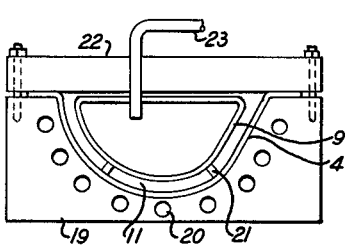
Figure 17:
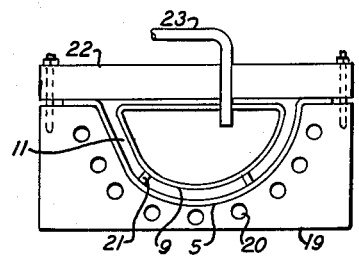

FIGS. 20, 21, 22, 23 and 24 illutrating the series and sequence of steps in the construction of the craft shown in FIG. 19.

Figure 1:
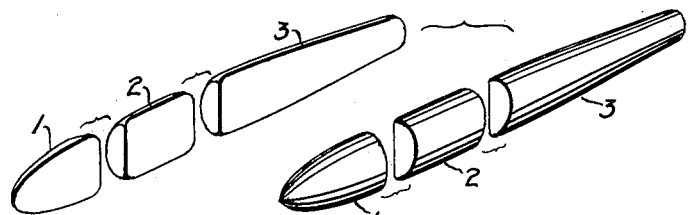
FIG. 1 is an exploded view of the several interior specially contoured shells embodied in a seaplane float structure.
Figure 2:
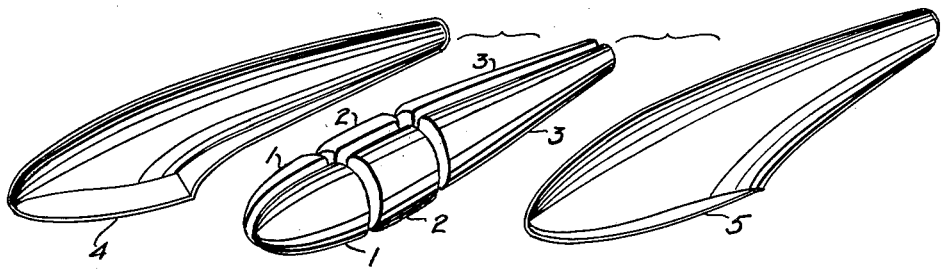
FIG. 2 is a perspective view showing the association of the interior shells and the exterior skins or surfaces.
Figure 3:
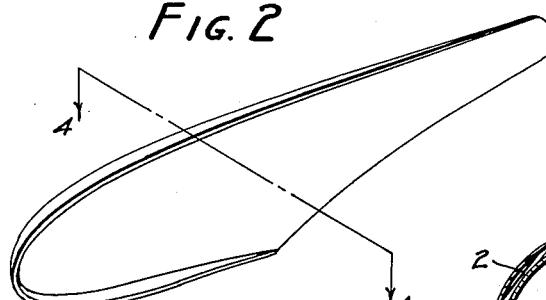
FIG. 3 is a perspective view of the assembled, completed float structure.
Figure 4:
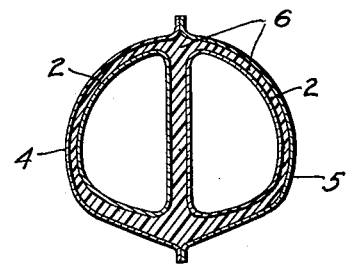
FIG. 4 is a cross section of the float taken on line 4—4 of FIG. 3.

The most basic way in which this invention can be used is with the interior shells suspended entirely unconnected within the exterior shell and without extra reinforcements. An example of this type of construction illustratively embodied in an airplane float is shown in FIGS. 1, 2 and 3. FIG. 1 shows the interior shells in their respective positions. These preferably are closed shells which can be made in two halves from suitable material and then adhered together or alternatively they can be made of several sections of formed aluminum which are adhered, welded or riveted along seams. In the preferred form these cells or individual units have rounded surfaces along all corners and the skins of these shells may vary in thickness according to the load which is to be sustained. FIG. 2 shows the cells 1, 2, 3 arranged in the positions they will assume inside the exterior shells 4 and 5 which latter are the exterior flanged shapes which constitute the outside coverings or the final shape of the float. These exterior shells may be made of any material which can be conveniently formed to this shape, such as aluminum, plastic or fiber glass reinforced plastic. These may vary in thickness according to the load carried through that part of the skin. The interior shells 1, 2, 3 are shown aligned but separated since this space between adjacent ends is the room which must exist for the light weight core material which here separates all the shells. In FIG. 3 is shown the final product which constitutes the combination of the exterior shells or encasements 4 and 5 around the suspended interior shells 1, 2 and 3. The exterior shell as explained is separated from the interior shells by a light weight core material. FIG. 4 shows a cross section of the finished float showing the association of the exterior shells 4 and 5 and the interior shell 2 and the interposed core material 6. As shown here this core material completely encompasses, is bonded to and suspends the cells. There are no joints between the cells and no reinforcing members, but in the event they are used this does not alter the spirit of the invention.

Another example of this new type of structure is the above described basic design modified by the use of appropriately located reinforcing member or members. This is illustrated as an example in the design of another seaplane float shown in FIGS. 5, 6 and 7. In FIG. 5 is illustrated the relation between the reinforcing member which in this case is a dorsal bulkhead 7 and the interior shells 8, 9 and 10. This reinforcing member can be made from any material, for example, aluminum, magnesium or suitable reinforced plastic. It can have thicker edges along its contour in order to give a higher moment of inertia. Such a dorsal bulkhead gives additional resisting strength for bending of the float and is contacted by the core material and stabilized by the core against buckling from compression forces. The shells 8, 9 and 10 are similar in construction to those in FIG. 1 previously described. FIG. 6 shows the exterior shells or the two unassembled sections or sides 4 and 5 which are the same type and contour as 5 and 6 in FIG. 2. As shown in FIG. 8 the light weight core material contacts the contiguous surfaces of the interior shells and exterior skin which holds the shells and other members as a unit. Adhesive can be used between the skins and core in order to make a better bond and provide a unitary structure which can of course be done on all products of this general nature.

Figure 9:
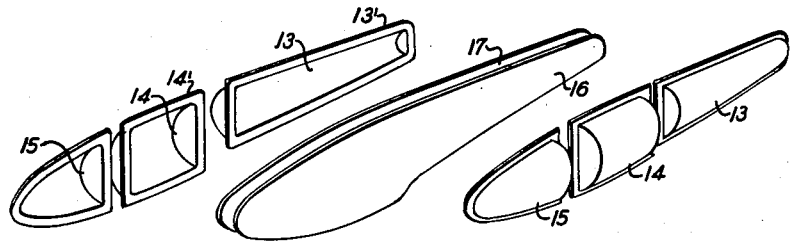
FIGS. 9, 10, 11 and 12 are views respectively similar to FIGS. 1, 2, 3 and 4 illustrating another system of reinforcing the basic structure shown in FIGS. 1 to 4.
Figure 10:
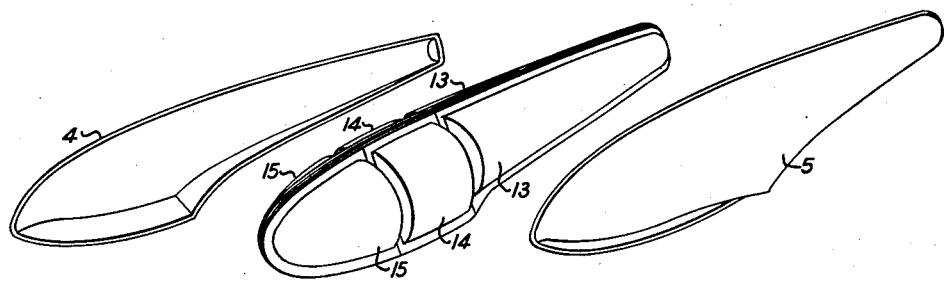
Figure 11:
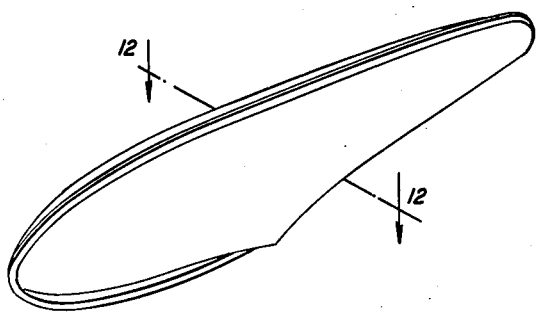
Figure 12:
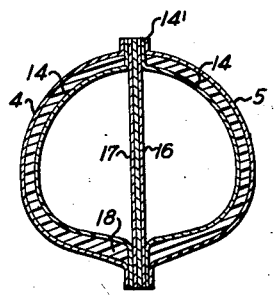
Figure 13:
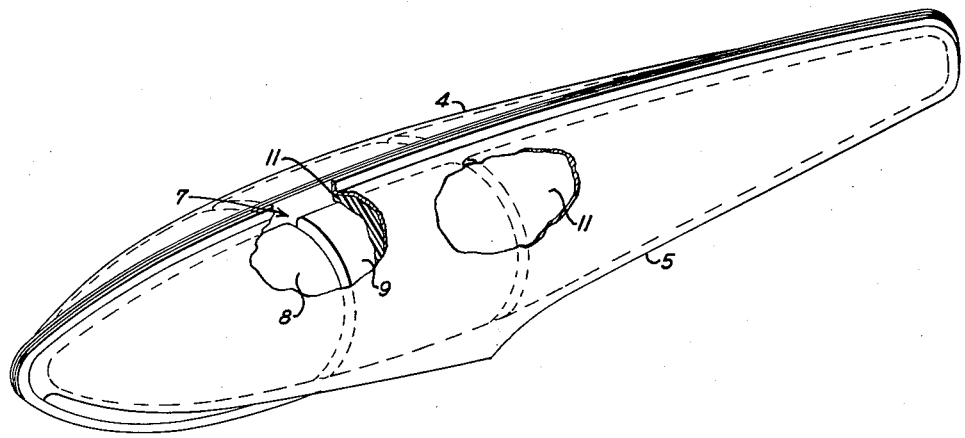
FIG. 13 is a view of the completed float of the type shown in FIGS. 5 to 8 with cutaway sections of the exterior skin to illustrate the association of the core material with the interior shells and exterior surfaces or skins.

Yet another way of modifying the basic design is by fastening some of these members together at places where this would be structurally advantageous. An example of this type of structure is shown in FIGS. 9, 10, 11 wherein each aligned series of shells 13, 14 and 15 are attached to the dorsal bulkhead sheets or members 16 and 17. As will be observed these sheets in conjunction with the lightweight core between them act as a longitudinal or dorsal bulkhead and at the same time form a portion of the surface of the shells. These shells preferably are formed with flanges 13', 14' and 15' which are fastened to the sheets 16 and 17 by adhesion, rivets or seam welding etc. all depending on the material employed. The core material, as shown in FIG. 12, is interposed between the interior skins 13, 14, 15 and the exterior skins 4 and 5 and between the adjacent ends of the shells 13, 14 and 15 separating one shell from the next. Thus the end sections of these shells function as bulkheads as they did in the other designs. As shown, particularly in FIG. 9, the units 13, 14 and 15, together with the attached members or fins 16 and 17 make up the series of closed shells. In this design the exterior shells 4 and 5 are suitably fastened to the interior shell at D—D and E—E. In this particular structure, the shells are partially but substantially isolated. FIG. 13 is another view of a completed float of the type shown in FIGS. 5, 6, 7, and 8. The cutaway section of the exterior shell 5 discloses the lightweight core in place and seen through the core are the edges of the shells 9 and 10. In the other section, a section of exterior skin is shown removed and also a segment of core is removed showing shells 8 and 9 and also part of the dorsal bulkhead 7. The described novel unitary structure may be assembled in any suitable manner. A typical method of manufacture using foam material as the core of a float is shown in FIGS. 14, 15, 16, 17 and 18.

Figure 18:
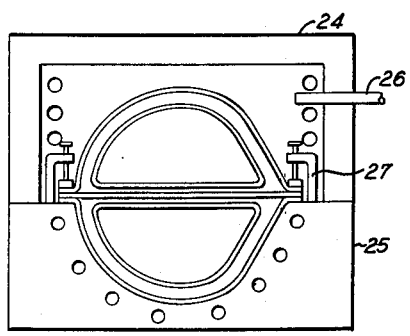

From an inspection of these figures the fabrication procedure will be readily understood. The two side shells 4 and 5 (FIGS. 14 and 15) are placed in the molds 19. The liquid foam material is then poured in the shells and then the interior shells 8, 9 and 10 (FIG. 13) are placed in spaced relation to the exterior shells. The spacers 21 can be used or other equivalent means to keep the proper separation between the interior and the exterior shell sections. The top member 22 of the mold is then fastened down and the mold heated by the steam admitted through pipe 20 to effect curing. Air pressure is applied through pipes 23 in order to equalize the pressure developed from the "foam in place" material. As will be understood, the core material expands and completely fills the gap or spaces between the shells. After curing to completion the two halves of the ultimate unit are taken from the molds and adhesive is applied on the flat surfaces of the two halves and the dorsal bulkhead 7. These parts are then placed in another form or press 25, as shown in FIG. 18, and pressure applied by the clamps 27 and/or air admitted through line 26. This pressure forces contact between the two halves to initiate optimum adhesion. The finished component is finally removed.

This foaming procedure will be understood by anyone skilled in the art. Any other equivalent method of forming the foam core material in situ may be utilized without departing from the spirit and scope of the invention. The principle of the invention may be understood to produce a number of diversified structures such as marine craft, as for example, a speed boat such as is shown in FIG. 19.

This craft consists basically of the exterior shells 28, 36 and the interior shells 31, 32, 33, 34 and 35 produced as previously described. These interior shells are separated from themselves and the exterior shells by the selected lightweight core material. All the shells 31, 32 and 33 have closed ends, thus the ends act as the walls of the bulkhead. A cockpit opening is shown cut through the exterior 28 through the core 29 and through the interior shell 30. This cockpit section shows a cross section of the two skins and the core material. Another opening is provided at the top of the shell 33 to establish an engine compartment. Shell 31 is designed to serve as the fuel tank. The other shells are completely closed. This type of construction in boats has an added advantage over that already explained in that these interior shells can be made closed as shown thus making the boat unsinkable. Such a craft, because of the great wall stability, can withstand powerful battering forces. The compartmented structure insures maximum safety, thus if the outside shell should be damaged the interior shell will still hold out the water and retain the necessary buoyancy. A craft produced in this manner makes it a well knit one unit construction practically indestructable and rot proof. A preferred method of constructing such a boat is illustrated in FIGS. 20, 21, 22, 23 and 24. This method can of course also be used for aircraft construction such as wings, fuselages and the tail surfaces. FIG. 20 shows the bottom of the shell of the boat. FIG. 21 shows the top half of the boat. FIG. 23 shows a cross section of the shell 36 in the mold 39. The first step before assembly may be the spraying or brushing of adhesive to the faying surfaces of the shells. Then the foam mixture is poured into the bottom part of the exterior shell 36. Next the interior shells 31, 32, 33, 34 and 35 are placed inside and spaced from the exterior shell 36, and the exterior top shell 28 is fitted into place after adhesive has been put on. The pressure bag 42 and the pressure lid 40 are then clamped tightly in position. Air pressure is applied through pipe 44 and a balancing or resisting pressure by pipe 41. Heat is applied by means of the steam pipes 45. Any air entrapped under the blanket is removed by pipe 46. The above procedure is just one illustrative method, and of course other methods may be used without affecting the scope of the invention or limiting its potential utility for the fabrication of other structures.

It will be understood that the particular embodiments described above have been presented to explain and illustrate the underlying concept of the invention. It will be appreciated that this concept may be invoked to design and fabricate a great number of diversified structures entering into widely different fields such as in the automotive and airplane industry, building construction, as for example in flooring panels and the like, and in other industries where structures having the characteristics of those described herein are desired.

The materials employed in the fabrication of structures contemplated under the invention may be widely varied and will be chosen as those best constituted and adapted to the demands and use of the particular structure to be produced. Thus lightweight metals and alloys, and alloy steels and sheet or other suitable formations and shapes, plastics, oriented or matted Fiberglas, laminated wood and the like may be employed in such structures.

While for purposes of explanation, certain associations of reinforcing members with the novel suspension nested shells, or compartments have been described it will be understood that any suitable reinforcing members or rigidifying members may be employed in selected positions and directions to adequately suspend the stressloads imposed on the particular structure. It will be understood therefore that the invention is of broad utility, and is not limited in scope to the particular embodiment described except as limitation to these are clearly imposed by the appended claims.

Having thus set forth our invention, we claim:

1. A structure of the character described comprising an exterior shell, a plurality of longitudinally and transversely spaced interior shells disposed within and spaced from the walls of said exterior shell, and a cohesive rigid light weight cellular core substantially filling the space delineated by the outer surfaces of said interior shells and the inner surface of said exterior shell to define a peripheral reinforcing member and transversely and longitudinally extending reinforcing panels.

2. The structure of claim 1 wherein said cellular core is adherent to the surfaces of said shells.

3. The structure of claim 1 wherein said cellular core is a foamed synthetic organic polymeric material formed in situ in said exterior shell.

4. The structure of claim 1 wherein the confronting faces of adjacent of said interior shells are substantially parallel and the confronting faces of said interior and exterior shells are substantially parallel.

5. The structure of claim 1 wherein said interior shells include longitudinally spaced pairs of transversely spaced complementary shaped shells.

6. The structure of claim 1 wherein said interior shells include confronting longitudinally extending walls defined by a pair of transversely spaced longitudinally extending panels.

7. The structure of claim 1 including a dorsal bulkhead longitudinally extending the length of said exterior shell and being secured thereto.

References Cited in the file of this patent

UNITED STATES PATENTS

| | | |
|---|---|---|
| 1,769,005 | Van Dusen | July 1, 1930 |
| 2,216,830 | Roberts | Oct. 8, 1940 |
| 2,629,698 | Sterling | Feb. 24, 1953 |
| 2,639,252 | Simon et al. | May 19, 1953 |
| 2,642,920 | Simon et al. | June 23, 1953 |
| 2,648,388 | Haines et al. | Aug. 11, 1953 |
| 2,714,557 | Mahaffy | Aug. 2, 1955 |

FOREIGN PATENTS

| | | |
|---|---|---|
| 720,956 | Great Britain | Dec. 29, 1954 |